United States Patent [19]

James

[11] 3,974,313

[45] Aug. 10, 1976

[54] PROJECTILE ENERGY ABSORBING PROTECTIVE BARRIER

[75] Inventor: Varnell L. James, Enumclaw, Wash.

[73] Assignee: The Boeing Company, Seattle, Wash.

[22] Filed: Aug. 22, 1974

[21] Appl. No.: 499,767

[52] U.S. Cl. .............................. 428/176; 89/36 R; 428/182; 428/225; 428/255; 428/911
[51] Int. Cl.² ...................... B32B 3/28; B32B 17/02
[58] Field of Search .................. 161/70, 71, 73, 88, 161/92, 93, 125, 133, 135, 404, 405, 128; 89/36 R, 36 A, 36 Z; 2/2.5 R; 109/49.5, 78; 428/179, 181, 183, 225, 228, 255, 911, 176

[56] References Cited
UNITED STATES PATENTS

| | | | |
|---|---|---|---|
| 2,562,951 | 8/1951 | Rose et al. | 89/36 A |
| 2,816,578 | 12/1957 | Frieder et al. | 2/2.5 |
| 3,486,966 | 12/1969 | Allen et al. | 161/404 |
| 3,519,529 | 7/1970 | Cook | 161/128 |
| 3,577,306 | 5/1971 | Baker et al. | 161/404 |
| 3,832,265 | 8/1974 | Denommee | 161/404 |

FOREIGN PATENTS OR APPLICATIONS

| | | | |
|---|---|---|---|
| 865,964 | 1/1941 | France | 89/36 |

*Primary Examiner*—Marion E. McCamish
*Assistant Examiner*—P. J. Thibodeau
*Attorney, Agent, or Firm*—Christensen, O'Connor, Garrison & Havelka

[57] ABSTRACT

A projectile energy absorbing protective barrier comprising a blanket formed of multiple layers of woven cloth and a rigid supporting layer is disclosed. Each cloth layer comprises a plurality of tapes, each tape formed of high tensile strength, continuous filaments having a low modulus of elasticity. The cloth layers are each woven in a manner such that relative sliding movement between the tapes is permitted. The rigid backing layer supports the multiple cloth layers in a corrugated configuration such that the longitudinal axes defined by the corrugation nodes lie at an angle relative to the direction of the weave pattern. The corrugations, and the weave pattern, allow the cloth layers to instantly move without resistance upon impact by a projectile, in the direction of projectile travel. Subsequent to impact and achieving the speed of the projectile, the filaments wrap partially around the projectile and contain it by reacting in tension. The invention can be in the form of a "window" and surround a portion of the projectile emitting mechanism. Further, the side of the barrier remote from the direction of projectile impact can be encased by an explosively rupturable wall adapted to form a part of the outer surface of a housing, such as a jet engine nacelle.

36 Claims, 19 Drawing Figures

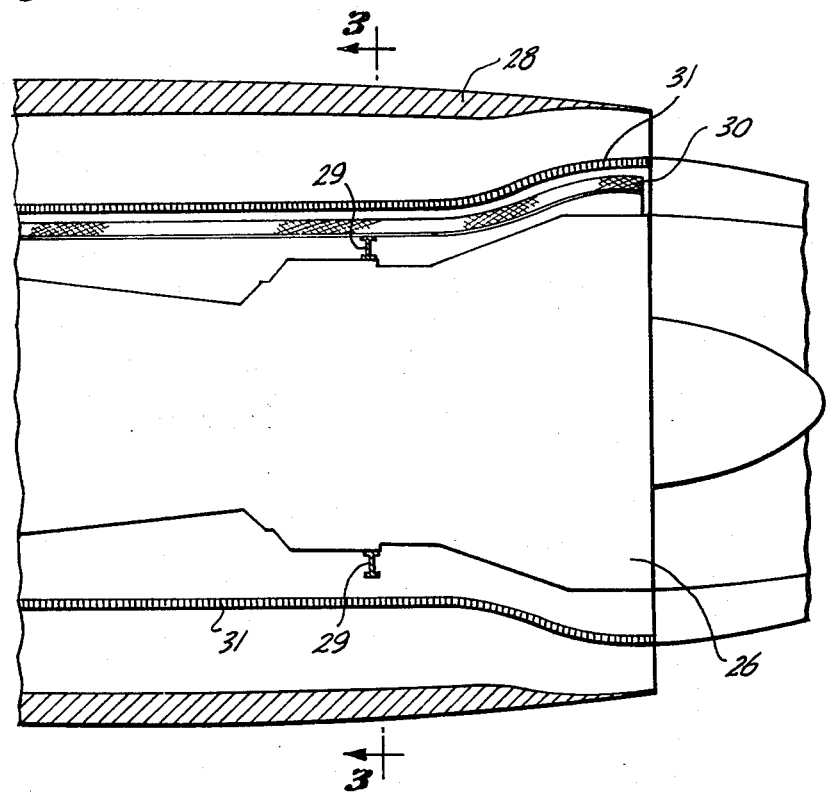
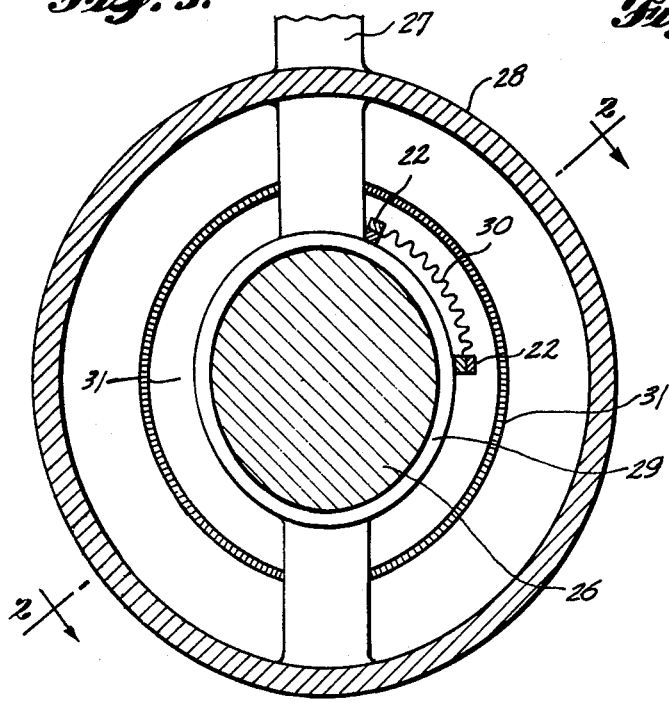
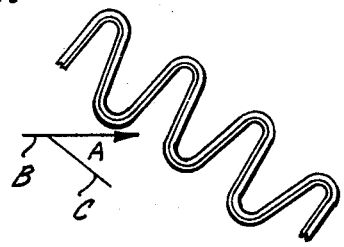
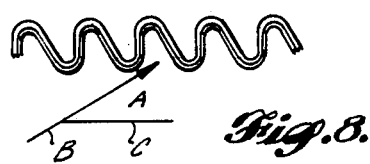
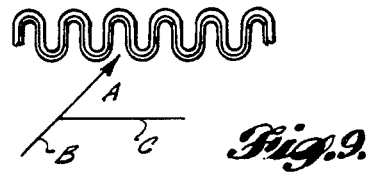

PROJECTILE ENERGY ABSORBING PROTECTIVE BARRIER

BACKGROUND OF THE INVENTION

This invention relates to protective barriers and, more particularly, to projectile energy absorbing protective barriers.

This invention was developed for, and finds particular use in, containing projectiles which could be emitted from bursting jet engines, and is illustrated and described in such an environment. However, it will be appreciated that the invention is also suitable for use in a variety of other environments. Broadly, the invention may be useful in any environment where it is desirable to set up a barrier between a potentially hazardous area and another area to prevent the passage of projectiles therebetween.

A variety of different types of protective barrier concepts have been proposed by the prior art. For various reasons these barrier concepts have not proven to be satisfactory either in terms of strength, strength-to-weight ratio, or operativeness in high temperature environments.

Thus, it is an object of this invention to provide a new and improved protective barrier.

It is also an object of this invention to provide a projectile protective barrier having an improved strength-to-weight ratio when compared to prior art projectile protective barriers.

It is another object of this invention to provide a projectile protective barrier suitable for use in preventing parts escaping from a bursting machine from leaving the area immediately adjacent to the machine.

It will be appreciated by those skilled in the aircraft art that one of the critical requirements of a jet engine projectile protective barrier is that it must be able to perform its function at temperatures well above the normal temperatures of ambient air.

Thus, it is a further object of this invention to provide a projectile protective barrier suitable for use in an environment wherein the temperature reaches levels well above the temperatures normally reached by ambient air.

It is yet another object of this invention to provide a new and improved projectile protective barrier suitable for use in combination with a jet engine.

SUMMARY OF THE INVENTION

In accordance with principles of this invention, a projectile energy absorbing protective barrier comprising a lightweight energy absorbing blanket made up of multiple layers of woven cloth is provided. Each cloth layer includes a plurality of tapes, preferably flat in cross-section. The tapes are woven such that they are associated with each other in a manner that permits relative sliding movement therebetween. Each tape is formed of high tensile strength, continuous filaments having a low modulus of elasticity. The blanket is undulated in a manner that allows it to move (elongate) when impacted upon a projectile, in the direction of projectile movement.

In accordance with further principles of the invention, each layer of cloth includes a plurality of warp tapes substantially perpendicularly interlaced with a plurality of filling tapes. Further, the blanket undulations are in the form of corrugations, and the blanket is supported in its corrugated configuration by a support layer formed of a rigid material and located on the impact side of the blanket. Moreover, the longitudinal axes defined by the corrugation nodes define an angle with respect to the longitudinal axes defined by both the warp and the filling tapes, preferably 45° with respect to each such tape.

In accordance with further principles of this invention, the continuous filaments are somewhat stretchable and flexible synthetic filaments or fibers that run the entire length of their respective tapes and have a tensile strength approaching 600,000 pounds per square inch and weights lying in the general range of from 1.5 to 3.0 grams per cubic centimeter.

In accordance with still other principles of this invention, the protective barrier is mounted such that the anticipated projectile path(s) of travel intersect the blanket at a predetermined angle. Preferably, the angle lies within the range of 30° to 45°, the particular angle being determined by the corrugation configuration.

A projectile energy absorbing protective barrier formed in accordance with the present invention is particularly useful with rotary machinery, such as aircraft jet engines. In these applications, the protective barrier can completely encircle the rotating part or parts, if desired. Alternatively, it can be formed in a "window" manner such that it encircles only a portion of the rotating parts. In the latter construction, the barrier is positioned between the rotating parts and the external structure desired to be protected (for example, an aircraft fuselage) so as to intercept projectiles traveling tangentially outwardly from the part within a predetermined range of directions. The "window" may be flat or curved. Moreover, the barrier can be mounted entirely within a jet engine nacelle, or form part of the nacelle. In the latter case, the side of the barrier remote from the jet engine is encased by an explosively rupturable wall. The wall may, for example, be formed of brittle glass or plastic and forms a portion of the nacelle. The primary requirement of the wall is that it ruptures in an explosive manner that does not inhibit the outward movement of the barrier when it is impacted by a projectile.

When a projectile intersects an energy absorbing protective barrier formed in accordance with the present invention, the impacted portion of the blanket instantaneously moves in the direction of projectile travel. Instantaneous movement is achieved because of the structural nature of the invention, i.e., the corrugations and loosely woven tapes allow a large degree of freedom of movement in a direction transverse to tape length. Subsequent to impact and achieving the speed of the projectile, the impacted filaments wrap partially around the projectile and contain it by reacting in tension against restraints. The restraints may be inertial (i.e. created by the nonimpacted regions of the blanket) or mechanical, such as structural affixing devices located along edges of the blanket lying parallel to the longitudinal axes defined by the nodes of the corrugations.

It will be appreciated from the foregoing summary that a lightweight energy absorbing protective barrier suitable for use in relatively high temperature environments (for example, the environment surrounding aircraft jet engines) is provided by the invention. As applied to an aircraft jet engine, the "window" manner of construction achieves a payload weight saving without loss of protection to vital areas of the aircraft structure.

BRIEF DESCRIPTION OF THE DRAWINGS

Other objects, advantages, and applications of the present invention will become apparent from the detailed description to follow when taken in conjunction with the accompanying drawings wherein:

FIG. 2 is a cross-sectional side elevation view along line 2—2 of FIG. 3 of a jet engine equipped with a protective barrier formed in accordance with the invention;

FIG. 3 is a transverse vertical cross-section taken along line 3—3 of FIG. 2;

FIG. 7 is side view of a portion of a protective barrier of the type illustrated in FIG. 1 in an open corrugation configuration;

FIG. 8 is generally similar to FIG. 7 and depicts the protective barrier in a sawtooth corrugation configuration;

FIG. 9 is generally similar to FIG. 7 and depicts the protective barrier in a closed corrugation configuration;

DESCRIPTION OF THE PREFERRED EMBODIMENT

Figure 1:
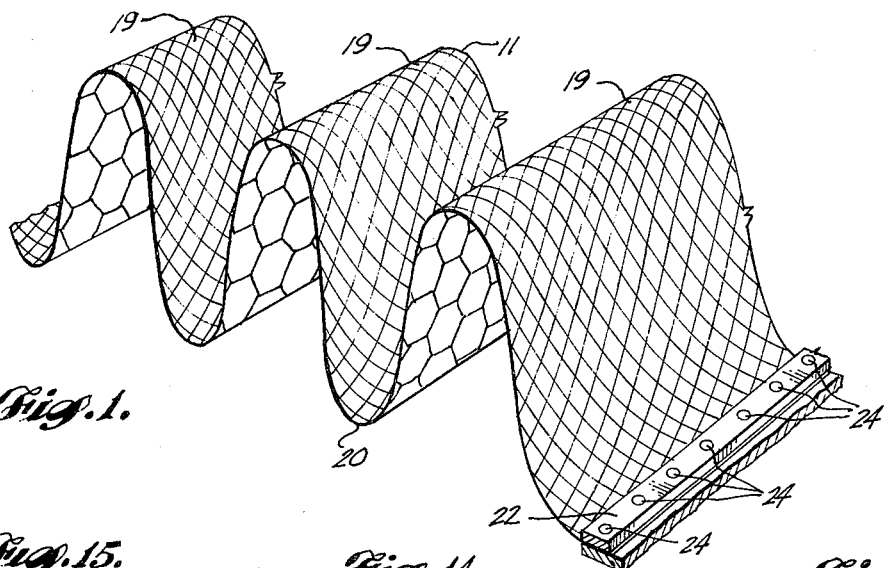
FIG. 1 is a perspective view of a portion of a projectile energy absorbing protective barrier formed in accordance with the present invention.
Figure 1A:
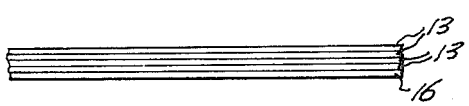
FIG. 1A is an enlarged cross-sectional view of a portion of the protective barrier illustrated in FIG. 1.

FIG. 1 illustrates a projectile energy absorbing protective barrier formed in accordance with the invention and comprises a blanket 11 formed of multiple superimposed layers 13 of woven cloth and a backing layer 16 (FIG. 1A). Each layer 13 comprises a plurality of tapes that are, preferably, generally flat when viewed in cross-section. While the tapes can form a unidirectional weave pattern, preferably, they form a bidirectional weave pattern. Examples of a variety of weave patterns of this nature are illustrated in FIGS. 10–15 and are hereinafter described in more detail. Thus, preferably, each blanket layer typically includes a plurality of warp tapes 10 perpendicularly interlaced with a plurality of filling tapes 12. The warp and filling tapes of each layer making up the blanket are mutually parallel to and slidably engaged in generally face-to-face fashion with corresponding tapes in adjacent layers.

Figure 1B:
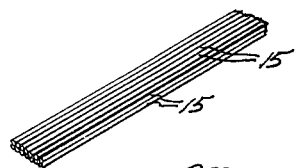
FIG. 1B is an enlarged perspective view of a portion of a tape suitable for use by the invention.

As illustrated in FIG. 1B, the tapes are made up of continuous filaments 15 lying substantially mutually parallel to one another. As will be better understood from the following more detailed description of the nature of the filaments, preferably, they have high tensile strength and a low modulus of elasticity. In addition, because continuously formed, they run the entire length of their respective tapes.

The blanket 11 is supported in an undulated configuration. While, preferably, the undulations are in the form of corrugations, the undulations can take on other forms. The only specific requirement of the actual form used is that is must allow the type of instantaneous uninhibited movement of the blanket in the direction of projectile travel hereinafter described. In the illustrated corrugated embodiment, the corrugations define nodes 19 and the nodes define longitudinal axes 18 that define an angle with respect to the axes defined by the warp and filling tapes. Preferably, the angle is 45° with respect to both such tapes. However it can lie between 30° and 60°, using either type of tape (warp or filling) as a reference.

The multiple superimposed layer 13 of the blanket 11 illustrated in FIG. 1 is supported in the corrugated configuration by the backing layer 16. The backing layer 16 must be disposed on the side of the blanket first impacted by the projectiles to avoid a "punch-press" effect and is formed of a lightweight penetrable material which, when punctured or penetrated by a projectile, either does not cut or only minimally cuts the tape filaments. The backing layer illustrated in the drawings is a wire lattice framework or netting generally similar to chicken wire. That is, the illustrated backing layer 16 is a wire grid that defines a plurality of hexagonal apertures. Obviously, other types of suitably rigid backing layers can be used to form an actual embodiment of the invention.

While the ends of the blanket 11 parallel to the nodes 19 may be clamped between elongated mutually opposed restraining strips 22 by one or more rivets 24 (or other suitable attachment means spaced from one another lengthwise of the strips), as illustrated in FIG. 1, such restraints can be eliminated if adequate inertial restraint is provided by nonimpacted regions of the blanket. The convoluted edge portions 20 of the blanket are not restrained at all. Rather, the cloth layers are treated by an epoxy or stitched together so as to prevent fraying without restraining or introducing resistance against blanket movement. In this regard stitching is preferred because epoxy is relatively inflexible when cured.

Figure 4:
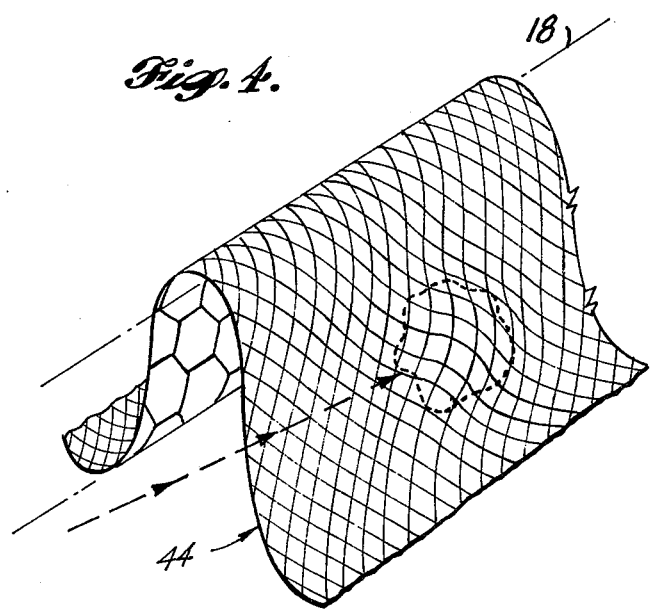
FIGS. 4–6 are fragmentary perspectives of the protective barrier illustrated in FIG. 1 depicting various positions achieved by the barrier when it is impacted by a projectile.
Figure 5:
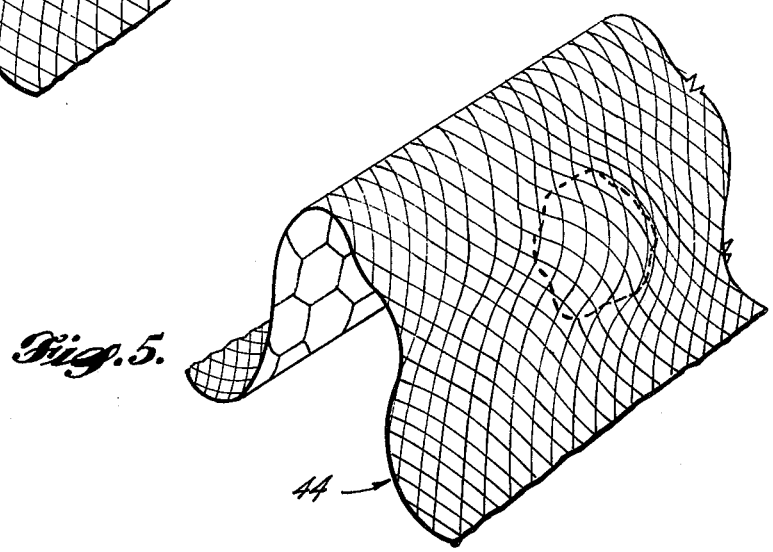
Figure 6:
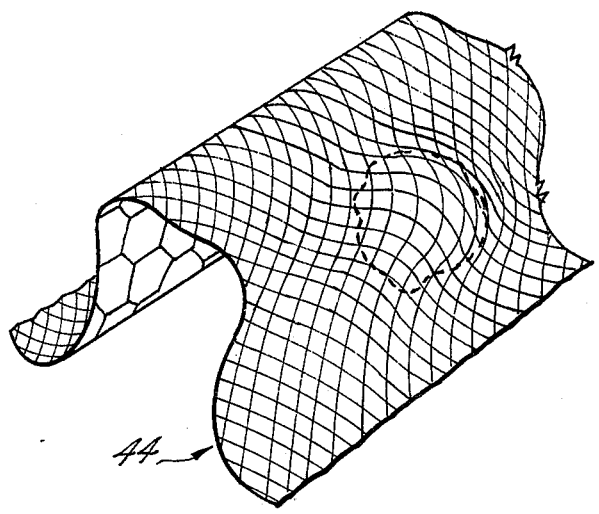

Prior to discussing specific weave patterns, suitable filament materials and the utilization of the invention in a jet engine environment, a brief description of the reaction sequence which occurs when a projectile impacts upon a protective barrier formed in accordance with the invention is set forth. As shown in FIGS. 4–6, when a projectile impacts on a protective barrier formed in accordance with the invention, the corrugations (undulations) become distorted. The initial impact moves the impacted region of the blanket along the flight path of the projectile. This movement distorts the impacted corrugation and produces relative sliding movement between the warp tapes 10 and the filling tapes 12. The projectile, thus, displaces and distributes the force over a wide area without stress or force concentrations.

Continued movement of the projectile along its flight path further distorts the impacted corrugation 44. The impacted corrugation elastically distorts outwardly into a bulging contour shape as depicted in FIGS. 5 and 6. Due to the inclusion of corrugations and the utilization of loosely woven layers of tapes formed of low inertial filaments, the distortion does not substantially inhibit movement of the projectile. Thus, the impacted region of the blanket is rapidly accelerated up to the speed of the projectile. During the acceleration phase, the filaments stretch elastically and, thus, in and of themselves do not apply appreciable resistance to the movement of the projectile. However, they do partially wrap around the projectile. In this manner, the impacted region reaches a velocity similiar to that of the projectile without the shearing action, normally associated with a material or barrier that does not readily displace, taking place.

As depicted in FIG. 6, after the filaments reach or near the speed of the projectile and wrap around a portion of the projectile, they react in tension. The reaction is against either nonimpacted regions of the blanket and/or the end restraints 22. As will be better understood from the following description of the nature of the continuous filaments, their elastic strength is adequate to absorb the energy of the projectile and, thus, stop its movement after they wrap about the projectile.

Preferably, the corrugations are formed and the protective barrier mounted so that impact occurs substantially perpendicular to a plane tangent to the generally flat surfaces connecting the nodes of the corrugations. It has been found that best results occur when the projectiles initially impact the top or node of one corrugation to start the acceleration of the blanket and then perpendicularly hit the "flat" surface of an adjacent corrugation. The proper selection of a corrugation configuration and mounting angle allows this preferential restriction to be satisfied in any particular environment of use. That is, a proper choice of corrugation configuration in combination with a proper choice of mounting "inclination" will allow most projectiles to impact at the desired impact angle. In this regard, FIGS. 7, 8 and 9 illustrate various corrugation configurations suitable for use by the invention. It has been found that the sawtooth configuration illustrated in FIG. 8 performs best when the impact angle A is approximately 30° whereas the closed corrugation configuration depicted in FIG. 9 performs best when the impact angle A is approximately 45°. The impact angle A for the open corrugation configuration depicted in FIG. 7 lies between these two angles. (As used herein, the impact angle, A, is generally defined as the angle the line, B, defined by the projectile path of travel makes with a plane, C, defined by the corrugation nodes or if that plane is curved, a further plane tangent to the curved plane.) Thus, it will be appreciated that the angle, pitch, shape and depth of the corrugation configurations selected can vary over a wide range and will be determined in a particular application by the environment of use.

Figure 15:
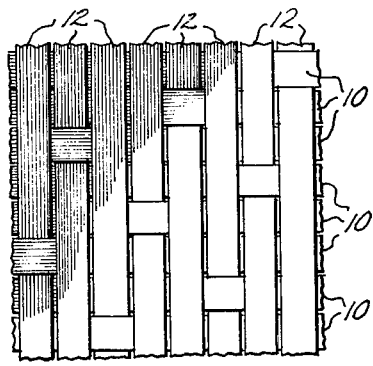
FIGS. 10–15 are plan views of weave patterns suitable for use in forming the multiple cloth layers included in the cloth blanket.
Figure 14:
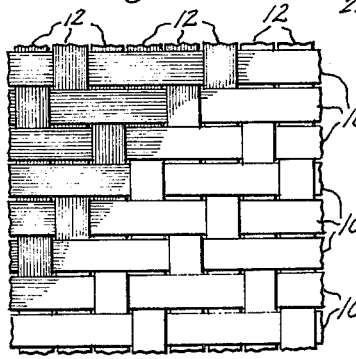
Figure 13:
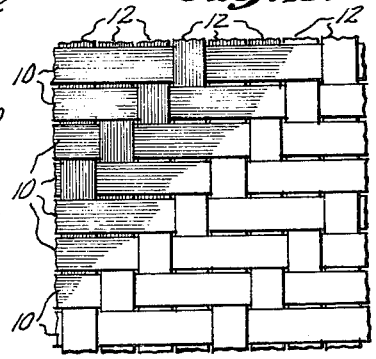
Figure 12:
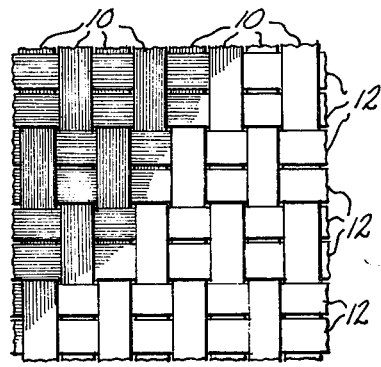
Figure 11:
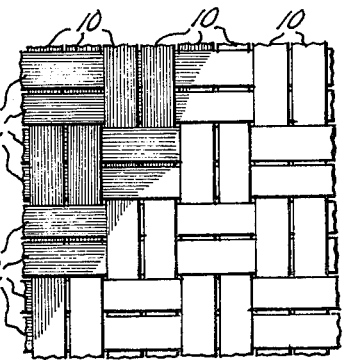
Figure 10:
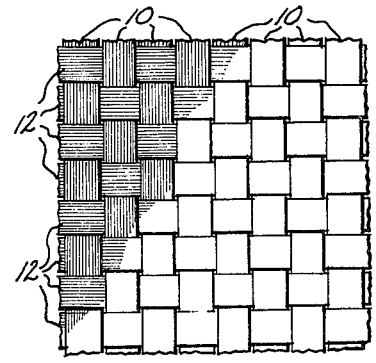

While, as stated above, the tapes can be arrayed in a unidirectional weave pattern, i.e., one wherein the warp yarn comprises tapes and the filling yarn comprises threads; preferably, the weave is a bidirectional tape weave pattern. A variety of such weave patterns are illustrated in FIGS. 10-15 of the drawings. Generally, the weave pattern selected must be loosely woven so as to permit relative sliding movement between the interlaced warp and filling tapes 10 and 12 when the barrier is impacted. With respect to the weave pattern illustrated in FIGS. 10-15, FIG. 10 illustrates a plain weave pattern wherein each warp tape 10 weaves over and under each filling tape 12. FIG. 11 illustrates a basket weave pattern wherein two or more warp tapes 10 weave as one warp tape over and then under two or more filling tapes 12 weaving as one filling tape. FIG. 12 illustrates a semi-basket weave pattern wherein one warp tape 10 weaves over and then under two or more filling tapes 12 weaving as a single tape. FIG. 13 illustrates a twill weave pattern wherein one warp tape 10 weaves over and under two, three or more filling tapes 12 in a regular pattern. FIG. 14 illustrates a crowfoot satin weave pattern wherein one warp tape 10 weaves over three and then under one filling tape 12. And, FIG. 15 illustrates a long shaft satin weave pattern wherein one warp tape 10 weaves over four or more filling tapes 12 and then under one filling tape.

It will be apparent from the foregoing discussion of suitable weave patterns that each pattern has slightly different characteristics, such as stability, pliability, porosity, slippage, strength, uniformity, drapability and sewability. The particular choice of weave pattern will, obviously, depend upon the environment of the use of an actual embodiment of the invention. Again, however, it is pointed out that the weave pattern chosen must be such that the warp and filling tapes can be loosely woven so as to permit sliding movement therebetween. It is also pointed out here that while, preferably, both the warp and the filling tapes comprise a plurality of generally parallel continuous filaments, each tape could be formed of a single continuous filament, if desired. However, such filaments must still be loosely woven to achieve the major benefits of the invention. Moreover, they must be held in an undulated configuration to achieve such benefits.

Obviously, the strength and nature of the filaments utilized to form the tapes will also depend upon the environment of use of the invention. Their strength and density will be determined by the energy of the projectiles which are likely to impact upon an actual embodiment of the invention. As briefly noted above, this invention was developed for use in combination with jet engines to provide a protective barrier designed to protect the passengers and structure of the aircraft from projectiles hurled outwardly from an exploding engine. For this use, the filaments must have high tensile strength and low density. Moreover, the filaments must be flexible so as to be freely movable in a direction transverse to their lengths without shearing when bent or wrapped partially about an object as previously described. Further, the filaments should be somewhat stretchable. Also, they must maintain the required characteristics in an environment where the temperature is well above the usual temperature of ambient air. While nylon and steel filaments can be utilized by the invention, in an aircraft environment, synthetic filaments are preferred. One example of a synthetic filament suitable for use by the present invention in a jet engine environment is a continuous glass filament, manufactured by Ferro Corporation, Ferro Glass Division, Fiberglass Rd., Nashville, Tenn., and sold under the tradename "S" glass. Another example of a synthetic filament suitable for use is an aromatic polyamide manufactured by E. I. Dupont Company, Wilmington, Del., and sold under the trademark Kevlar, particularly Kevlar (TM) 49. Both of these synthetic filaments have high strength-to-weight ratios, and an adequate amount of elasticity. In fact, Kevlar (TM) 49 has a strength-to-weight ratio approximately five times as good as steel. More specifically, both S-glass and Kevlar (TM) 49 have strengths approaching 600,000 pounds per square inch. S-glass weighs approximately 3.0 grams per cubic centimeter and Kevlar (TM) 49 weighs approximately 1.5 grams per cubic centimeter.

Obviously, other filament materials can also be used by the invention, depending upon the ultimate environment of use and the energy and nature of the projectiles to be contained.

A protective barrier formed in accordance with the invention can be used either to entirely surround a jet engine or partially surround it. Partial encirclement is herein referred to as a "window" configuration. For purposes of discussion, a window configuration jet engine embodiment of the invention is herein illustrated and described. FIGS. 2 and 3 illustrate schematically a jet engine 26 positioned within a nacelle 28. A suitable support strut 27 supports the nacelle and the jet engine beneath an aircraft wing (not shown) is a manner well known in the art. For purposes of discussion, it is assumed that the fuselage of the aircraft is located above and to the right of the location of the engine illustrated in FIG. 3.

The energy absorbing protective barrier 30 is curved in the upper right quadrant of the cross-sectional view illustrated in FIG. 3. Thus, the protective barrier is located such that it lies between the longitudinal axis defined by the jet engine 26 and the fuselage of the aircraft. Further, the protective barrier lies between the jet engine 26 and the nacelle 38. Resilient bulkheads 29, only one of which is illustrated in the drawings, surround the jet engine 26 and support the mechanical restraints 22 such that their longitudinal axes are substantially parallel to the longitudinal axis of the jet engine. Thus, the axes 18 defined by the nodes of the corrugations also are generally parallel to the longitudinal axis of the jet engine. Preferably, the curvature of the protective barrier 30 is such that the longitudinal axis defined by the center of curvature is generally coincident with the longitudinal axis defined by the jet engine 26. Also illustrated in FIGS. 2 and 3 is an acoustic barrier 31 that encircles both the jet engine and the energy absorbing barrier 30.

It will be appreciated from viewing FIGS. 2 and 3 and the foregoing description that the "window" configuration energy absorbing protective barrier intercepts projectiles traveling tangentially outwardly from the engine 26 in the direction of the aircraft's fuselage. Without the energy absorbing protective barrier, such projectiles could, if possessing sufficient energy, harm vital aircraft components. In addition, such projectiles could harm the passengers or crew of the aircraft.

Obviously the dimensions of the "window" configuration of the invention are determined by the relative positions of the engine 26 and the vital areas of the aircraft structure to be protected. Thus, while only a quadrant "window" configuration is illustrated in FIG. 3, the barrier can be extended circumferentially in either direction to protect additional areas of the aricraft. In fact, the protective barrier can extend completely around the engine casing. The longitudinal dimension of the barrier can also be varied and will depend upon which region or regions of the engine are likely to hurl a dangerous projectile outwardly during an engine malfunction or burst. Moreover, additional "windows" can be positioned elsewhere about the engine as deemed necessary. Obviously the window construction has a weight advantage over total engine encirclement; hence, it is preferable in most jet engine environments.

It will be appreciated by those skilled in the art and others that window configuration of the invention in a jet engine environment has the added advantage that the mechanical restraints 22 will cooperate with the resilient bulkhead 29 to provide a further energy absorbing arrangement. This further energy absorbing arrangement will resiliently dissipate the impact energy through the aircraft structure. Thus, the aircraft structure as well as the protective barrier will be used to absorb or dissipate the projectile energy. It should be noted that parts emitted from a bursting jet engine are thrown tangentially outwardly in predetermined angular directions. Thus, the protective barrier of the invention can be readily formed and positioned such that a projectile will only be intercepted by one intercorrugation 44, in most instances. Thus, the protective barrier can be formed and positioned such that the impact angle will meet the criteria set forth above. In this regard it should be noted that a primary reason for positioning the protective barrier so that a projectile will strike one inwardly projecting corrugation is to permit free unwinding or bulging of the impacted region of the blanket without resistance because restraint is likely to result in shearing of the impacted filaments. This resistance to movement, for example, occurs when the barrier is positioned to accept projectile impact at a small impact angle A, with the result that several corrugations pile up or bunch together. Such resistance also can be introduced into the containment system by positioning an outer layer of material, such as the acoustic barrier 31 illustrated in FIGS. 2 and 3 to close to the outer nonimpacted side of the blanket. In that case, the bulging impacted area of the blanket engages the outer layer before it has a chance to completely unwind and then is sheared by the projectile driving the filaments against the outer layer in a manner similar to the action of a punch press.

For purposes of containment in most explosive or burst applications, such as in a jet aircraft environment, danger to structure and personnel is minimized or eliminated even if the projectile penetrates the protective barrier, so long as the residual velocity is below 100 feet per second. However, in some cases it may be desirable to completely contain the projectile, depending upon the economic and practical trade-offs of system weight and cost for increased assurance of complete containment. The increased probability of complete containment is achieved by adding more cloth layers to the blanket. However, the number of cloth layers which can be superimposed upon one another is limited because the likelihood of filament shearing increases as the number of layers increases. Thus, the number of layers selected in an actual embodiment of the invention will depend upon the anticipated mass and energy of the projectile, the density of the cloth and other relevant factors that will be apparent to those skilled in the art. In most jet engine applications, it has been found that 12–16 layers in the maximum number that can be practically used. In this regard, it should be noted that the probability of containment is also increased by mounting a second, generally similar, protective barrier outwardly or behind a first protective barrier. Obviously there must be a space between the two barriers to allow each to operate in the manner herein described.

Figure 16:
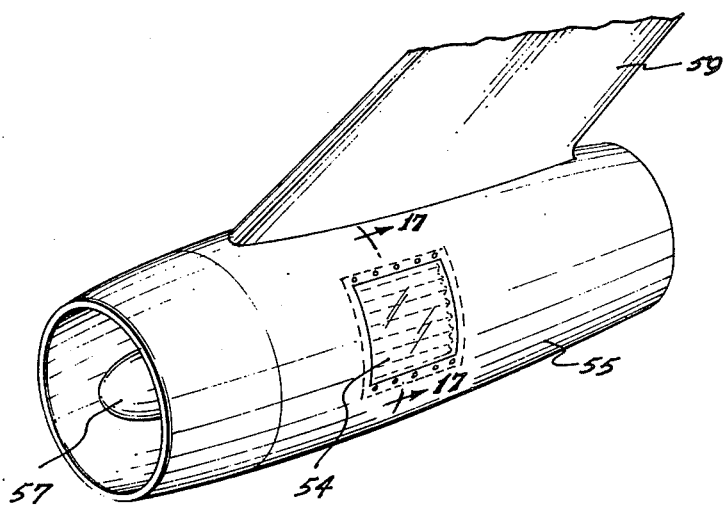
FIG. 16 is a perspective view of an embodiment of the invention forming a portion of an engine nacelle; and, FIG. 17 is a cross-sectional view along line 17—17 of FIG. 16.
Figure 17:
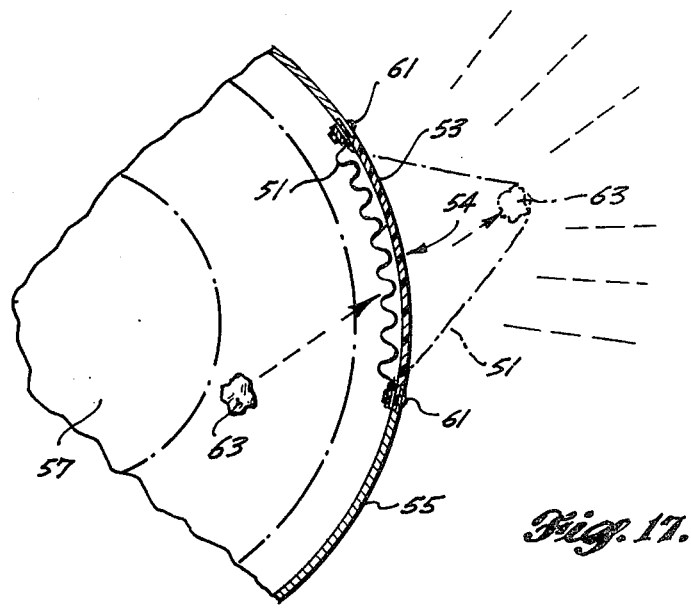

FIGS. 16 and 17 illustrate an alternate jet engine protective barrier formed in accordance with that invention. In many environments, the alternate embodiment of the invention illustrated in FIGS. 16 and 17 may be preferred to the embodiment illustrated in FIGS. 2 and 3, and described above, because it forms a portion of the engine nacelle and is easily replaced, as opposed to being mounted between the jet engine and the nacelle.

The embodiment of the invention illustrated in FIGS. 16 and 17 comprises a protective barrier 51 formed in the manner described above and a wall 53. The wall 53 is formed of an explosively rupturable material such as brittle glass of plastic. That is, the wall is formed of a brittle material that substantially entirely disintegrates when it is only slightly impacted at any point; yet is relatively stiff prior to impact.

The wall 53 and the protective barrier 51 form a replaceable unit 54 mounted in a suitable aperture in the nacelle 55 housing a jet engine 57. The nacelle 55 is illustrated in FIG. 16 as affixed to a strut 59 extending downwardly from a wing (not illustrated). Thus, the replaceable unit 54 forms a window in the nacelle 55. The wall 53 is curved so as to be flush with the outer surface of the nacelle 55. Suitable attachment means, such as bolts 61, support the unit 54 in the aperture in the nacelle.

In operation, when a projectile 63 is hurled outwardly from the jet engine 57, it impacts on the barrier 51 which then reacts outwardly in the manner previously described to contain the projectile. As soon as the barrier 51 starts to move outwardly, it impinges on the wall 53 causing it to rupture. Because of its nature, the wall ruptures in an explosive manner, whereby it does not place any restraint on the outward movement of the barrier. Thus, the barrier is free to contain the projectile in exactly the same manner described above i.e., as far as the projectile containment sequence of the barrier is concerned, the wall doesn't appear to exist.

It will be appreciated that various modifications and/or changes can be made in the embodiment of the invention described herein without departing from the spirit and scope of the present invention. It is to be understood, therefore, that the previous description is intended to be illustrative only and not limiting, and that the true spirit and scope of the present invention will be determined by reference to the appended claims.

The embodiments of the invention in which an exclusive property or privilege is claimed are defined as follows:

1. A projectile energy absorbing protective barrier comprising:
at least one flexible cloth layer formed of a plurality of tapes loosely woven together so as to allow sliding movement therebetween, each of said tapes being formed of flexible, relatively high tensile strength, low modulus of elasticity filaments; and,
support means supporting said at least one cloth layer in an undulated configuration that will allow said layer to elongate when impacted by a projectile.

2. A projectile energy absorbing protective barrier as claimed in claim 1 wherein a plurality of relatively high tensile strength, low modulus of elasticity filaments form each of said tapes and wherein said filaments are continuous filaments that run the entire length of their related tapes, the filaments forming each of said tapes lying substantially mutually parallel to one another.

3. A projectile energy absorbing protective barrier as claimed in claim 2 wherein said continuous filaments are synthetic filaments having a high strength-to-weight ratio.

4. A projectile energy absorbing protective barrier as claimed in claim 3, wherein said support means comprises a rigid backing layer superimposed on one face of said at least one cloth layer so as to form an undulated blanket with said at least one cloth layer.

5. A projectile energy absorbing protective barrier as claimed in claim 4 wherein the undulations in said blanket are in the form of corrugations which define generally parallel nodes.

6. A projectile energy absorbing barrier as claimed in claim 5 wherein said tapes are loosely woven together in a bidirectional manner whereby some of said tapes form filling tapes and the others of said tapes from warp tapes.

7. A projectile energy absorbing protective barrier as claimed in claim 6 wherein the longitudinal axes defined by said corrugation nodes define angles of from 30° to 60° with respect to the longitudinal axes defined by one of said warp or filling tapes.

8. A projectile energy absorbing protective barrier as claimed in claim 4, wherein said backing layer comprises an open lattice.

9. A projectile energy absorbing protective barrier as claimed in claim 7, wherein said angles are 45°.

10. A projectile energy absorbing protective barrier as claimed in claim 4 further comprising a wall located on the side of said at least one cloth layer remote from said backing layer, said wall being formed of a material adapted to rupture in an explosive manner upon being impacted.

11. A projectile energy absorbing protective barrier as claimed in claim 3, wherein said tapes are loosely woven together in a bidirectional manner whereby some of said tapes form filling tapes and the others of said tapes form warp tapes.

12. A projectile energy absorbing protective barrier as claimed in claim 11 wherein the undulations in said cloth layer are in the form of corrugations which define generally parallel nodes.

13. A projectile energy absorbing protective barrier as claimed in claim 12, wherein the longitudinal axes defined by said corrugation nodes define angles of from 30° to 60° with respect to the longitudinal axes defined by one of said warp or filling tapes.

14. A projectile energy absorbing protective barrier as claimed in claim 1, wherein said at least one cloth layer includes a plurality of cloth layers superimposed one upon another, each of said layers formed of a plurality of tapes woven togehter, each of said tapes formed of a plurality of relatively high tensile strength, low modulus of elasticity filaments, lying substantially mutually parallel with respect to one another.

15. A projectile energy absorbing protective barrier as claimed in claim 14, wherein each of said cloth layers are woven in a loose manner which allows the tapes making up said layers to readily move with respect to one another and which allows said layers to readily move with respect to one another.

16. A projectile energy absorbing protective barrier as claimed in claim 15 wherein said support means is located on one side of said plurality of cloth layers and wherein said barrier further comprises a wall located on the other side of said plurality of cloth layers, said wall being formed of a material adapted to rupture in an explosive manner upon being impacted.

17. A projectile energy absorbing protective barrier as claimed in claim 15, wherein said tapes are loosely woven together in a bidirectional manner whereby some of said tapes form filling tapes and the others of said tapes form warp tapes.

18. A projectile energy absorbing protective barrier as claimed in claim 17, wherein the undulations in said plurality of cloth layers are in the form of corrugations which define generally parallel nodes.

19. A projectile energy absorbing protective barrier as claimed in claim 18, wherein the longitudinal axes defined by said corrugation nodes define angles of from 30° to 60° with respect to the longitudinal axes defined by one of said warp or filling tapes.

20. A projectile energy absorbing protective barrier as claimed in claim 19, wherein said support means comprises an open lattice backing layer superimposed on one side of said plurality of layers.

21. A projectile energy absorbing protective barrier as claimed in claim 20 wherein said plurality of relatively high tensile strength, low modulus of elasticity filaments forming said tapes are continuous filaments that run the entire length of their related tapes.

22. A projectile energy absorbing protective barrier as claimed in claim 21 wherein said continuous filaments are synthetic filaments having a high strength-to-weight ratio.

23. A projectile energy absorbing barrier as claimed in claim 15 wherein said plurality of relatively high tensile strength, low modulus of elasticity filaments forming said tapes are continuous filaments that run the entire length of their related tapes.

24. A projectile energy absorbing protective barrier as claimed in claim 23 wherein said continuous filaments are synthetic filaments having a high strength-to-weight ratio.

25. A projectile energy absorbing protective barrier suitable for use in combination with a machine having moving parts likely to be hurled outwardly away from said machine should said machine explode mechanically, said projectile energy absorbing protective barrier comprising:
   A. a blanket including:
      1. a plurality of superimposed, flexible, cloth layers, each of said cloth layers being formed of a plurality of tapes woven together so as to allow sliding movement therebetween, each of said tapes being formed of a plurality of flexible relatively high tensile strength, low modulus of elasticity filaments, lying substantially mutually parallel to one another; and,
      2. an undulated backing layer superimposed on one side of said plurality of cloth layers for supporting and maintaining said plurality of cloth layers in an undulated configuration that will allow said plurality of cloth layers to elongate when impacted upon by one of said parts; and,
   B. mounting means suitable for mounting said blanket in a predetermined position with respect to such a machine.

26. A projectile energy absorbing protective barrier as claimed in claim 25 including a wall mounted on the side of said blanket remote from said backing layer, said wall being formed of a brittle material adapted to rupture in an explosive manner upon being impacted.

27. A projectile energy absorbing protective barrier as claimed in claim 26 wherein said brittle material is glass.

28. A projectile energy absorbing protective barrier as claimed in claim 26 wherein said brittle material is plastic.

29. A projectile energy absorbing protective barrier as claimed in claim 25, wherein each of said cloth layers are woven in a loose manner which allows the tapes making up said woven in a loose manner which allows the tapes making up said layers to readily move with respect to one another and which allows said layers to readily move with respect to one another.

30. A projectile energy absorbing protective barrier as claimed in claim 29, wherein said tapes are loosely woven together in a bidirectional manner whereby some of said tapes form filling tapes and the others of said tapes form warp tapes.

31. A projectile energy absorbing protective barrier as claimed in claim 30, wherein said filaments are continuous filaments that run the entire length of their related tapes.

32. A projectile energy absorbing protective barrier as claimed in claim 31 wherein said continuous filaments are synthetic filaments having a high strength-to-weight ratio.

33. A projectile energy absorbing protective barrier as claimed in claim 32 wherein the undulations in said plurality of cloth layers are in the form of corrugations which define generally parallel nodes.

34. A projectile energy absorbing protective barrier as claimed in claim 33 including a wall mounted on the side of said blanket remote from said backing layer, said wall being formed of a material adapted to rupture in an explosive manner.

35. A projectile energy absorbing protective barrier as claimed in claim 33, wherein the longitudinal axes defined by said corrugation nodes define angles of from 30° to 60° with respect to the longitudinal axes defined by one of said warp or filling tapes.

36. A projectile energy absorbing protective barrier as claimed in claim 25, wherein said backing layer comprises on open lattice.

* * * * *

UNITED STATES PATENT AND TRADEMARK OFFICE
CERTIFICATE OF CORRECTION

PATENT NO. : 3,974,313
DATED : August 10, 1976
INVENTOR(S) : Varnell L. James

It is certified that error appears in the above-identified patent and that said Letters Patent are hereby corrected as shown below:

Column 10, line 8: before the word "barrier" insert --protective--.

Column 10, line 14: delete "togehter" and insert therefor --together--.

Column 11, line 23: before the word "barrier" insert --protective--.

Column 12, lines 18 and 19: delete "woven in a loose manner which allows the tapes making up said".

Signed and Sealed this

Twenty-third Day of November 1976

[SEAL]

Attest:

RUTH C. MASON
Attesting Officer

C. MARSHALL DANN
Commissioner of Patents and Trademarks